United States Patent [19]

Yoshioka

[11] Patent Number: 4,471,186

[45] Date of Patent: Sep. 11, 1984

[54] ABNORMAL CONDITION DETECTOR OF ELECTRIC APPARATUS

[75] Inventor: Takeo Yoshioka, Amagasaki, Japan

[73] Assignee: Mitsubishi Denki Kabushiki Kaisha, Tokyo, Japan

[21] Appl. No.: 405,741

[22] Filed: Aug. 6, 1982

Related U.S. Application Data

[63] Continuation of Ser. No. 158,789, Jun. 12, 1980, abandoned, which is a continuation of Ser. No. 950,059, Oct. 10, 1978, abandoned.

[51] Int. Cl.³ .................... H01H 33/82; G01N 21/80; G01N 31/22

[52] U.S. Cl. ................................. 200/148 B; 422/59; 422/86; 436/119

[58] Field of Search ....................... 422/83, 86, 87, 88, 422/89, 58, 59; 436/124, 119, 167, 163; 200/148 B

[56] References Cited

U.S. PATENT DOCUMENTS

| | | | |
|---|---|---|---|
| 2,176,462 | 10/1939 | McAllister | 23/232 R |
| 3,068,073 | 12/1962 | Stanford | 23/232 R |
| 3,094,392 | 6/1963 | Skala | 422/83 X |
| 3,311,454 | 3/1967 | Kemeny et al. | 422/88 X |
| 3,512,939 | 5/1970 | Hugi | 422/86 |
| 3,831,430 | 8/1974 | Azinger, Jr. | 200/148 B X |
| 3,950,136 | 4/1976 | Bellinga | 422/83 X |
| 4,046,512 | 9/1977 | Kaczmarek et al. | 23/232 R |
| 4,102,193 | 7/1978 | Smith et al. | 23/232 R |
| 4,142,416 | 3/1979 | Smith et al. | 23/232 R X |
| 4,169,708 | 10/1979 | Muggli | 23/232 E |

OTHER PUBLICATIONS

Britton, "Hydrogen Ion", vol. 1, Third Edition, D. Van Nostrand Co., Inc., New York, 1943, p. 401.

Ecknig et al., Chemical Abstracts, vol. 89, 1978, No. 89:156121p.

*Primary Examiner*—Arnold Turk

*Attorney, Agent, or Firm*—Oblon, Fisher, Spivak, McClelland & Maier

[57] ABSTRACT

An abnormal condition detector detects an abnormal condition of an electric apparatus by sampling an insulating fluid filled in the electric apparatus under a pressurized condition and detecting a change of the condition of an indicator induced by an acidic gas in the sampled insulating fluid.

4 Claims, 8 Drawing Figures

ABNORMAL CONDITION DETECTOR OF ELECTRIC APPARATUS

This application is a continuation of U.S. Ser. No. 158,789, now abandoned, filed June 12, 1980, which was a continuation of U.S. Ser. No. 950,059 filed Oct. 10, 1978, now abandoned.

BACKGROUND OF THE INVENTION

1. Field of the Invention

The present invention relates to an abnormal condition detector of an electric apparatus in which an insulating gas is filled, such as gas insulating switch.

2. Description of the Prior Arts

In general, reactive acidic gases such as $SF_4$ and HF are produced as decomposed components in an electric apparatus containing $SF_6$ gas such as a gas insulating switch and acidic gases such as $NO_2$ are produced as decomposed components in an electric apparatus containing air and acidic gases such as HF are produced as decomposed components in an electric apparatus containing freon gas.

These acidic gases cause a corrosion of the electric apparatus to shorten the life of the electric apparatus. Accordingly it is desired to detect the formation of the acidic gases that is the abnormal condition in early stage.

In general, when a fault is caused in an electric apparatus, the decomposed gases are produced whereby a commercial gas detector can be used as a fault detector.

However, such gas detector is mainly used for detecting a low concentration level and it responds to only one object component and it is not clearly understood whether suitable detection can be performed when various decomposed gases are produced in the electric apparatus and they are gradually produced.

FIGS. 1 and 2 show sectional views of the conventional gas detectors used for the fault detection.

In FIGS. 1 and 2, the numeral reference (1) designates a detecting tube through which a measured gas is passed; (11) designates a detecting material being inductive with a specific component contained in the measured gas and the detecting material is contained in the detecting tube (1); (2) designates a sucking means for passing the measured gas through the detecting tube (1). In the embodiment of FIG. 1, a cylinder is used as the sucking means and in the embodiment of FIG. 2, a rubber bellows is used as the sucking means. The reference numeral (21) designates means for detachably connecting the detecting tube (1) to the sucking means (2). In FIG. 2, the reference numerals (22), (23) designate a pair of switch valves for pumping function.

In the gas detector having the above-mentioned structure, one end of the detecting tube (1) is disposed to the measured gas under the atmospheric pressure and a specific amount of the measured gas is sucked by the sucking means (2) and a specific component such as $SO_2$, CO, $NO_2$ gas is analyzed by qualitative or quantative analysis depending upon the kind of the detecting material (11) and the coloring range of the detecting material.

However, in the conventional apparatus or the conventional method of detecting the abnormal condition of the electric apparatus by the gas detector measuring the acidic gases produced by certain fault in the electric apparatus such as a gas insulating switch, the electric apparatus containing a fluid such as the gas insulating switch is under pressurized condition, whereby it is necessary to reduce the pressure by a pressure control valve and also to use a chamber for storing the measured gas. Moreover, it takes a long time such as one minute per one stroke. When a concentration of the measured gas is low, many strokes are disadvantageously required for the sampling disadvantageously.

The conventional apparatus has such disadvantages. In the case of an apparatus having many gas chambers such as a gas insulating substation, there is the further disadvantage of lack of speed for detecting the abnormal condition.

SUMMARY OF THE INVENTION

It is an object of the present invention to provide an abnormal condition detector such as fault detector which easily and precisely detects fast an abnormal condition of an electric apparatus in which an insulating fluid is filled such as gas insulating switch.

It is another object of the present invention to provide an abnormal condition detector of an electric apparatus which detects a fault of the electric apparatus by detecting an acidic gas from the viewpoint of the fact that most gases produced by a fault in the electric apparatus are acidic gases.

DETAILED DESCRIPTION OF THE PREFERRED EMBODIMENTS

Figure 1:
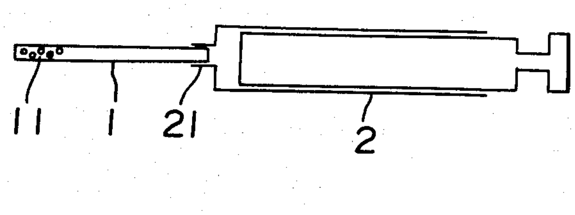
FIG. 1 PRIOR ART
FIGS. 1 and 2 are sectional views of the conventional gas detectors.
Figure 2:
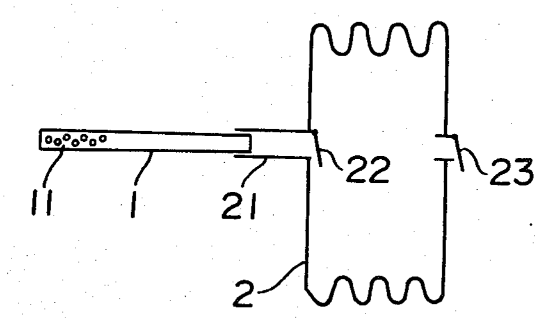
FIG. 2 PRIOR ART
Figure 3:
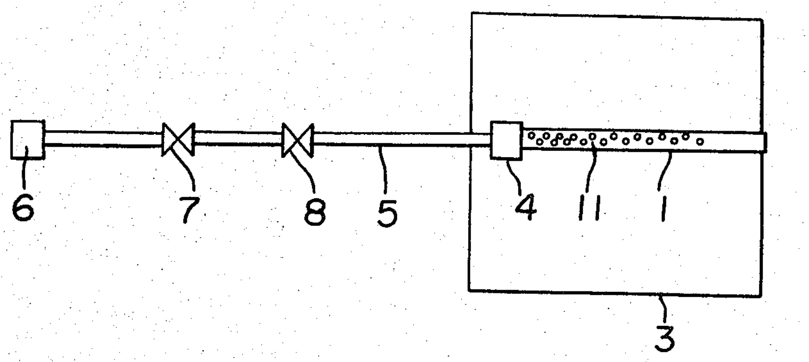
FIG. 3 is a schematic view of one embodiment of an abnormal condition detector of the present invention.

FIG. 3 shows the structure of one embodiment of the abnormal condition detector of the present invention wherein the reference numeral (3) designates a transparent box containing a detecting element of a detecting tube (1); (4) designates joint means which is contained in the transparent box (3) and is connected to the detecting tube (1); (5) a tube for passing a measured fluid which is connected to the joint means (4); (6) designates joint means which is connected to one end of the tube and is connected to a fluid sampling part connected through a switch valve to a fluid containing electric apparatus such as a gas insulating switch (not shown); (7) designates a valve which is disposed in a passage of the tube (5) to open and close the passage; (8) designates a flow rate control means for the measured fluid passing through the tube (5).

The operation of the abnormal condition detector having the above-mentioned structure will be illustrated.

The flow rate control means (8) is controlled to give a predetermined value and the joint means (6) is connected to the sampling part in the electric apparatus (not shown) under the condition closing the valve (7).

Then, the valve of the electric apparatus (not shown) and the valve (7) are opened to pass the measured gas such as $SF_6$ gas into the detecting tube (1) at a constant flow rate. After passing the fluid for a specific time, the valve (7) is closed and the length of the color change region of the detecting material (11) is read whereby the concentration of a specific component in the measured fluid such as acidic decomposed gas and the abnormal condition of the electric apparatus can be detected from the concentration. The detecting tube (1) can be exchanged to use a new one in each measurement.

As shown in FIG. 3, the detector of the present invention has simple structure and light weight and is compact to be convenient for carrying and accordingly, the detector is significantly advantageous for detecting the abnormal condition of the electric apparatus which is used in a gas insulating substation.

Even though the pressure of the fluid is higher than the atmospheric pressure, the fluid can be tested in high speed. The abnormal condition detector of the present invention can be also used for the other electric apparatuses and it can be used to detect the abnormal condition of an electric apparatus in which freon is filled.

It is preferable to provide a by-pass for removing the residual fluid from the tube (5) or to provide a flow rate meter, since the accuracy is improved.

The detecting material (11) used in the detector of the present invention can be a material which can not be used in qualitative analysis when the detector is used only for detecting the abnormal condition. For example, a material for detecting total amounts of the noxious acidic components is used for detecting the abnormal condition in simple manner.

As described above, in accordance with the present invention, the abnormal condition of the electric apparatus in which a fluid is filled, can be easily detected very quickly.

Figure 4:
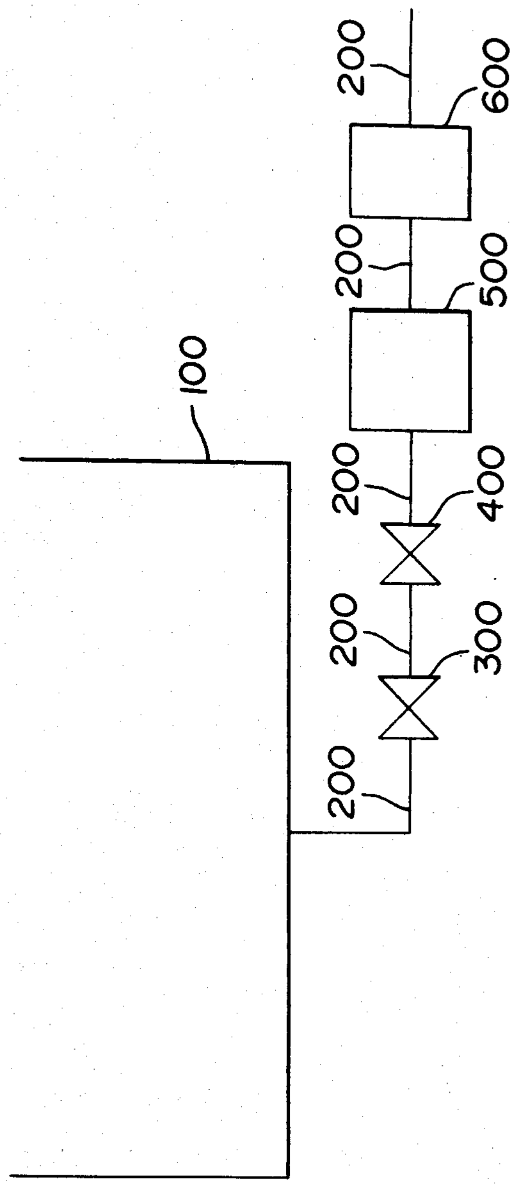
FIG. 4 is a block diagram showing an application of an abnormal condition detector of the present invention.

FIG. 4 is a block diagram of an electric apparatus equipped with an abnormal condition detector of the present invention.

In FIG. 4, the reference numeral (100) designates an electric apparatus such as gas insulator switch which contains a high voltage conductor and is filled with $SF_6$ gas; (200) designates a tube passage for discharging the $SF_6$ gas from the electric apparatus (100); (300) designates a stop valve for holding the $SF_6$ gas in the electric apparatus (100); (400) designates a flow rate control valve; (500) designates an abnormal condition detector of the present invention and (600) designates a flow rate meter for measuring a flow rate of the gas passing through the tube passage (200).

Figure 5:
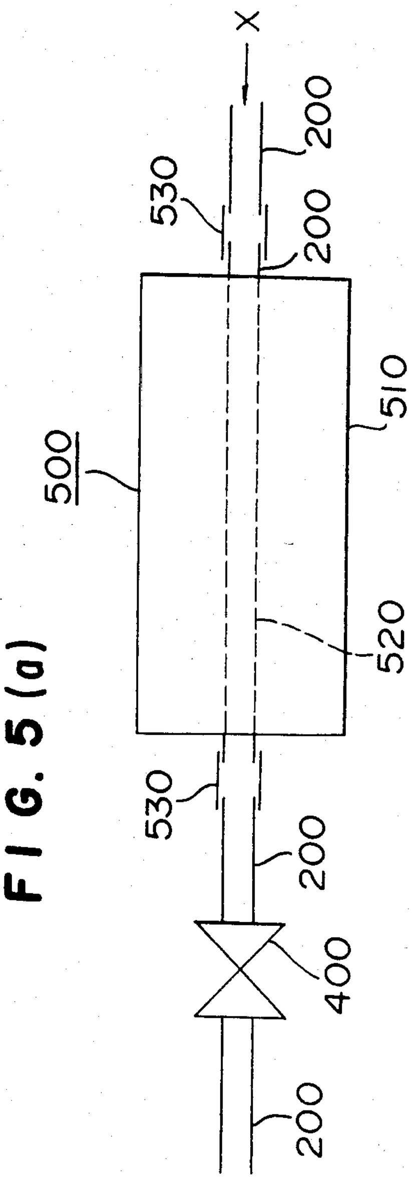
FIG. 5*a* is a schematic side view illustrating the structure of one embodiment of the abnormal condition detector of the present invention.
FIG. 5*b* is a schematic front view of the embodiment shown in FIG. 5*a;*
Figure 5:
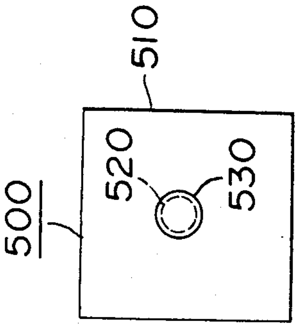

FIG. 5 shows the structure of one embodiment of the abnormal condition detector of the present invention. In FIG. 5, the reference numeral (520) designates a detecting element whose color or concentration is changed by inducing with an acidic gas; (510) designates a box made of transparent acryl resin through which the change of the detector (520) is detected and (530) designates a connecting tube for connecting the tube passage (200) and the abnormal condition detector (500). FIG. 5(*a*) shows a side view of the abnormal condition detector (500) and FIG. 5(*b*) shows a front view thereof from the arrow line direction X.

Figure 6:
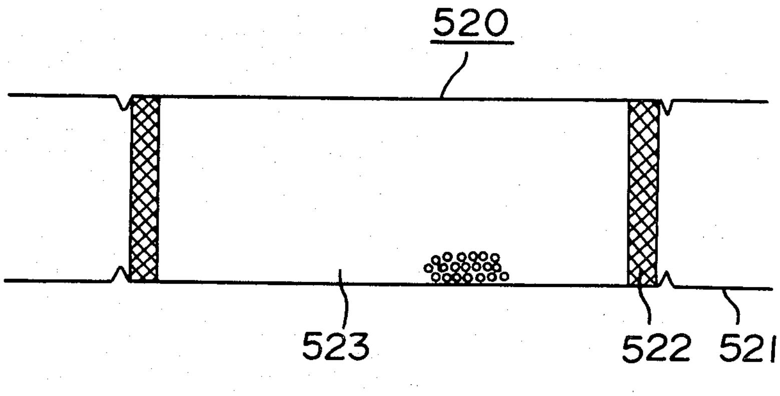
FIG. 6 is a partially enlarged view of a detector element shown in FIG. 5.

FIG. 6 is a partially enlarged view of the detail structure of the detector element (520) of FIG. 5. In FIG. 6, the reference numeral (521) designates a glass tube; (523) designates a chromatographically active alumina (basic) adsorbing Bromocresol purple sealed in the glass tube (521); (522) designates a cotton plug for supporting the active alumina (523).

The principle of the abnormal condition detector of the electric apparatus having the above-mentioned structure which is applied for a $SF_6$ gas apparatus will be illustrated.

When an arc is generated at a junction of a high voltage conductor, between the high voltage conductor and a surface of an insulating substance or between the high voltage conductors, $SF_6$ gas is decomposed to generate low fluorinated sulfur compounds such as $SF_4$. These low fluorinated sulfur compounds are chemically unstable to react with water in the $SF_6$ gas or the substance of the apparatus whereby acidic gases such as HF, $SO_2$, $SiF_4$, etc. are formed.

When an arc is generated on or near the surface of the insulating substance, the carbon component of the insulating substance or the other material in the apparatus is decomposed with oxygen gas to form carbon dioxide gas ($CO_2$) together with the decomposition of $SF_6$ gas.

Among the resulting acidic gases, $SF_4$, HF and $SiF_4$ are chemically unstable whereby they are reacted with the components of the substrates of the apparatus to be consumed and further they are adsorbed into an adsorbent disposed in the apparatus for a moisture adsorption or decomposed gas absorption whereby the reduction of the concentration of these gases is relatively fast. On the other hand, $SO_2$ and $CO_2$ are chemically stable and the effect of the adsorbent is relatively slow.

From the viewpoints of the modes of the gas components, when the fault current is relatively large, enough amounts of $SF_4$, HF and other gases are remained for a long time, whereas when the fault current is small and is continuously passed, most of $SF_4$, HF and $SiF_4$ are adsorbed to remain only $SO_2$ and $CO_2$. Accordingly, in order to detect such fault current, it is preferable to use a detector inducing to all of the acidic gases.

Accordingly, as shown in FIGS. 4 to 6, the gases are discharged from the electric apparatus (100) through the tube passage (200) as measured gases, and are passed through the detecting element (520) which contains the chromatographically active alumina (basic) (523) adsorbing Bromocresol purple as a titration indicator. In order to detect the gases quantitatively, the flow rate of the gases is controlled by the flow rate control valve (400). When the particle size of the active alumina (basic) (523) is small and the passing gases are acidic, the color is changed from purple to yellow under enough reaction. Accordingly, the fault in the electric apparatus (100) can be detected by observing the condition of the color change of the detecting element (520) in the abnormal condition detector (500) through the box (510) made of the acryl resin. The quantitative detection may be attained by the observation of the flow rate of the gases and the length of the color change.

The detector element (520) shown in FIG. 6 can be prepared by the following method.

In the preparation, 3 ml of an indicator solution of Bromocresol purple (0.5 g of Bromocresol purple+90 ml of ethanol (95 vol. %) balanced with water to be 100 ml) was mixed with 30 g of an active alumina for chromatography and a small amount of water is added and the mixture is thoroughly mixed to be in a uniform colored condition and to be tacky between particles.

The active alumina is dried by passing under a dry nitrogen gas at about room temperature.

The dried active alumina (basic) particles (523) are densely filled in the glass tube (521). Both ends of the glass tube (521) are clogged with cotton plugs (522) for buffering and holding the active alumina. It is preferable to cover the detector element (520) with plastic caps in the non-use condition so as to shield it from air.

Figure 7:
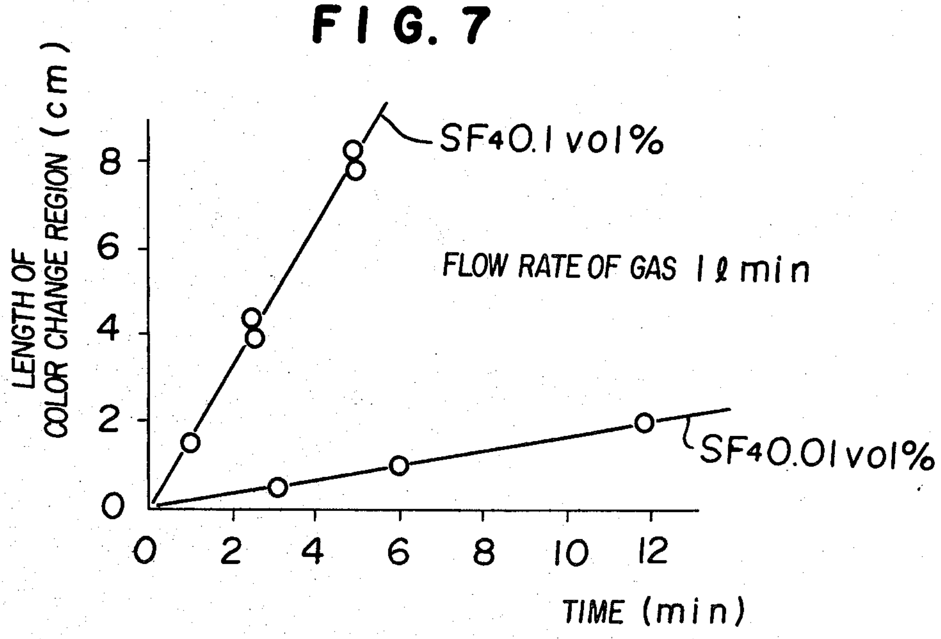
FIG. 7 is a graph for illustrating a response of the detector element.

In regard to the response of the detector element, the responses to various concentrations of $SF_4$ in terms of the length of the color change region for a water content of 10 wt. % are shown in FIG. 7.

It is also possible to use the other indicators having suitable pH color change interval such as Bromothymol Blue, Phenol Red, Neutral Red, Curcumine, Thymol Blue, Phenolphthalein, Cresolphthalein, Thymolphthalein, etc. together with the indicator mentioned above.

In order to enlarge the lower limit of the detection, it is preferable to fill particles having similar specific gravity and similar particle size.

When broader quantitative measurement range is required, it is preferable to prepare the detector element by adding a predetermined amount of a base to the active alumina for chromatography.

It is possible to eliminate needless components from the object for the measurement by selectively using a specific indicator.

As described above, in accordance with the present invention, the abnormal condition such as a partial arcing which is continuously caused can be effectively detected as well as a detection of the fault, in the principle different from electrical or mechanical detection. Accordingly, the detection of the present invention can be combined with the electrical or mechanical detection. It is possible to detect $NO_2$ caused by a partial arcing of an electric apparatus using air as an insulating medium as the measuring object which reacts to produce an acidic gas and the economic abnormal condition detector of an electric apparatus can be obtained.

What is claimed is:

1. In combination, an abnormal condition detector and a switchgear apparatus, comprising:

a switchgear apparatus having a sampling part;

an abnormal condition detector comprising;

joint means removably connected to said sampling part for sampling a fluid contained in the switchgear apparatus, a valve coupled to said joint means and which can be opened and closed at predetermined times to admit said fluid therethrough for a predetermined time duration, flow rate control means which is disposed in a passage connecting to said valve for controlling a rate of flow of said sampling fluid during said predetermined time duration, detecting means connected to said flow rate control means for detecting a specific component in said fluid sampled through said flow rate control means, said specific component in said sample fluid being a decomposed acidic gas produced by the decomposition of an insulating fluid in said electric apparatus, whereby an abnormal condition of said switchgear apparatus is detected from the detection of said specific component, said detecting means comprising, a detecting material usably disposed in said tube and whose color is changed by absorption of said decomposed gas, wherein said detecting material is a material whose color change length is varied depending upon a concentration of said decomposed gas of said fluid, the controlled flow rate, and the predetermined time duration during which said valve is opened, and wherein said detecting material is a chromatographically active alumina for detecting an acidic decomposed gas produced by decomposing $SF_6$, wherein said alumina has a water content of 10% by weight.

2. The combination according to claim 1, wherein said detecting tube includes a transparent portion in which said chromatographically active alumina is densely filled.

3. The combination according to claim 2, wherein gas permeable fibrous plugs for holding said chromatographically active alumina are inserted at both ends of said transparent tube portion.

4. The combination according to claim 3, wherein said chromatographically active alumina includes Bromocresol purple.

* * * * *